United States Patent [19]

Mashita et al.

[11] 4,433,340
[45] Feb. 21, 1984

[54] OPTICAL RECORDING MEDIUM

[75] Inventors: Masao Mashita, Yokohama; Nobuaki Yasuda, Zushi, both of Japan; Tomoyuki Ishibshi, deceased, late of Yokohama, Japan; Satoshi Ishibashi, legal representative, Himeji, Japan

[73] Assignee: Tokyo Shibaura Denki Kabushiki Kaisha, Kawasaki, Japan

[21] Appl. No.: 360,665

[22] Filed: Mar. 22, 1982

[30] Foreign Application Priority Data

Apr. 3, 1981 [JP] Japan .................................. 56-49392

[51] Int. Cl.³ ............................................ G01D 15/34
[52] U.S. Cl. ................................ 346/135.1; 346/76 L; 430/348; 430/945
[58] Field of Search ......................... 346/135.1, 76 L; 430/945, 348, 616

[56] References Cited

U.S. PATENT DOCUMENTS 4,318,112 3/1982 Kivits .............................. 346/135.1
4,335,198 6/1982 Hanada ........................ 346/135.1 X
4,348,461 9/1982 Terao ........................... 346/135.1 X

FOREIGN PATENT DOCUMENTS 5264905 11/1975 Japan.

OTHER PUBLICATIONS

Densi Tsushin Gakkai, Densi Buhin Zairyo Kenkyukai (CPM80-71); Y. Asano et al.; (Nov. 1980).

*Primary Examiner*—Joseph W. Hartary
*Attorney, Agent, or Firm*—Oblon, Fisher, Spivak, McClelland & Maier

[57] ABSTRACT

Disclosed is an optical recording medium. This optical recording medium has a substrate made of a transparent material such as an acrylic resin; and a recording layer for receiving an energy beam such as a laser beam whose intensity is changed in response to quantized information and for receiving desired information by melt-deforming in response to the intensity of the energy beam. The recording layer contains tellurium as a base material and carbon at a predetermined content of 40 atomic percent.

16 Claims, 13 Drawing Figures

OPTICAL RECORDING MEDIUM

BACKGROUND OF THE INVENTION

The present invention relates to a medium for optically recording information and, more particularly, to an optical recording medium which receives an energy beam such as a laser beam of an intensity varying in accordance with information and which records information by melt-deforming in accordance with the intensity.

Conventionally, an optical recording medium such as an optical disc comprises a substrate and a recording layer which is formed on the substrate. When information is recorded on the optical disc, an energy beam such as a laser beam which changes its intensity in accordance with the information is radiated on the recording layer. The recording layer melt-deforms in response to the laser beam. As a result, a pit array corresponding to the information is formed on the recording layer.

A material comprising the recording layer is generally required to satisfy the following conditions. In the first place, the material must have good sensitivity (initial characteristic), in other words, the material must require only a small amount of energy (mJ/cm$^2$) per unit area for forming the pit. In the second place, the material ideally must not change over time or it may change slightly. The material must have a long service life. Currently, tellurium (Te) is used as the material for the recording layer. Te has good sensitivity for an energy beam such as a laser beam, so that tellurium is one of the most favorable materials in this field.

However, when Te is exposed to the outer atmosphere, Te is easily oxidized by oxygen or moisture which is included in the air. An undesirable oxide tends to be formed on the surface of the layer. As a result, tellurium changes over time, thus degrading its sensitivity. In other words, Te satisfies the first condition. However, Te fails to satisfy the second condition. For example, when Te is exposed to an atmosphere under severe testing conditions such as a temperature of 70° C. and a relative humidity of 85%, the sensitivity of the Te layer degrades by about 20% in about 5 hours. The sensitivity degrades by about 50% in about 15 hours. The service life characteristic obtained in the above test indicates that information recording with stability and high quality is not possible with a conventional recording medium comprising a Te layer as the recording layer. On the other hand, in order to improve the antioxidant characteristics of the Te layer, a protection layer comprising, for example, an organic material is coated on the Te layer. In this manner, a method for sealing the Te layer from the outer atmosphere has been performed by formation of a protection layer on the Te layer. However, the capacity of the protection layer which seals the Te layer from the outer atmosphere is low because the organic material gradually absorbs moisture as time passes. As a result, a desired and adequate service life, that is, at least 10 years in the normal atmosphere (normal temperature and humidity), has not been accomplished.

SUMMARY OF THE INVENTION

It is an object of the present invention to provide an optical recording medium having excellent initial characteristics such as sensitivity and showing a long service life.

In order to achieve the above and other objects of the present invention, there is provided an optical recording medium comprising recording layer which receives an energy beam such as a laser beam which changes an intensity thereof in accordance with quantized information and melt-deforms in accordance with the intensity of the energy beam to record desired information; and substrate which supports the recording layer means. The recording layer includes a mixture layer containing tellurium as the base material and at least carbon at a predetermined ratio.

DETAILED DESCRIPTION OF THE PREFERRED EMBODIMENTS

Figure 1:
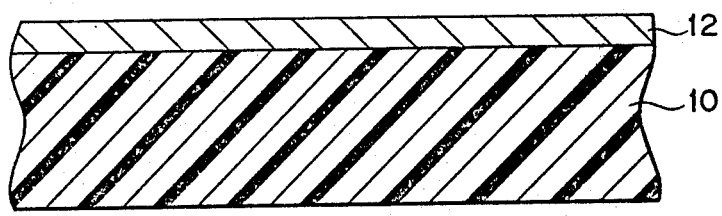
FIG. 1 is a sectional view of the main part of an optical recording medium according to one embodiment of the present invention.

Referring now to FIG. 1, there is shown a sectional view of an optical recording medium according to the first embodiment of the present invention. A substrate 10 is made of a plastic, glass or an acrylic resin as one of the synthetic resin materials. The material of the substrate 10 can be arbitrarily selected according to the method for reading out recorded information adopted. In this embodiment, the substrate 10 is formed by an acrylic resin to a thickness of about 1.5 mm. The acrylic resin is less expensive than glass and molding is easy for mass production. The recording layer 12 is formed on the substrate 10. The recording layer 12 must be thick enough to accomplish more than predetermined reflectance and simultaneously thin enough to prevent the degradation of sensitivity. In consideration of these conditions, the recording layer 12 is formed to a thickness of substantially 200 Å to 1 μm. The recording layer 12 contains tellurium as the base material and further contains carbon (C) in a predetermined ratio. The content of carbon which is contained in the recording layer 12 is described by the ratio of carbon to tellurium. The ratio of carbon is determined in a range of 5 to 50 atomic percent, preferably in the range of 10 to 40 atomic percent. In this embodiment, the content of C contained in the recording layer 12 was determined to be about 40 atomic percent. The recording layer 12 which contains Te and C (to be referred to as a Te-C layer for brevity hereinafter) is formed by sputtering Te as the target in an atmosphere of a gas mixture of methane ($CH_4$) or acetylene ($C_2H_2$) with argon (Ar). The ratio of C which is contained in the Te-C layer 12 is freely controlled by changing a mixing ratio of Ar and $CH_4$ (or $C_2H_2$). For example, when the mixing ratio (Ar/$CH_4$) is set to 0 in the gas mixture, the content of C in the Te-C layer is about 40 atomic percent.

Figure 2A:
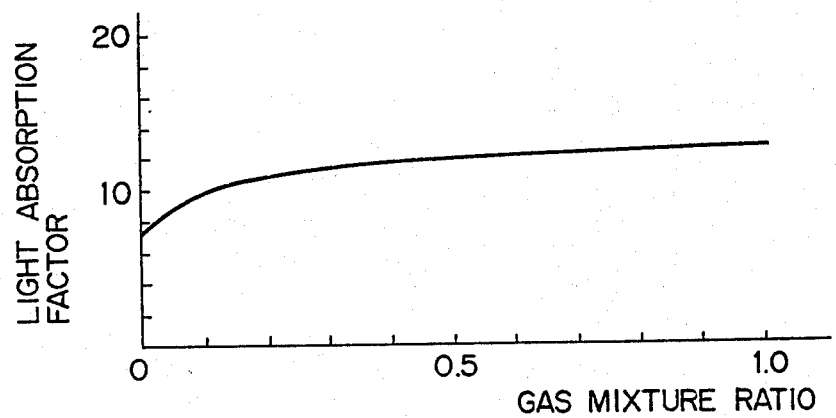
FIGS. 2A to 2C are graphs illustrating main characteristic data according to one embodiment of FIG. 1.
Figure 2B:
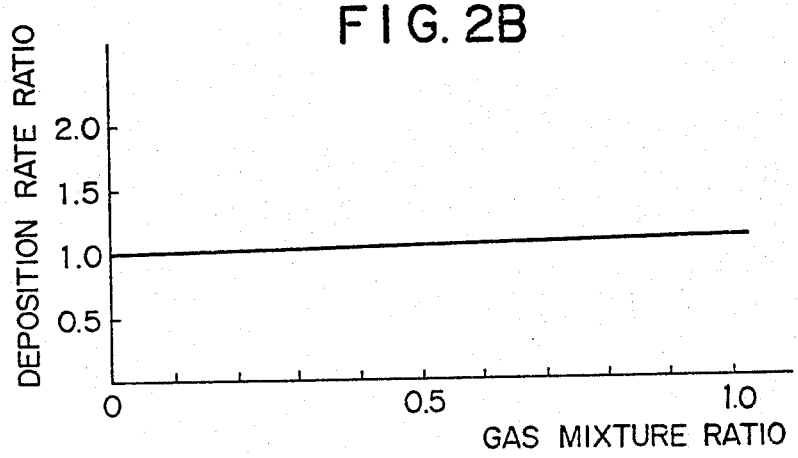
Figure 2C:
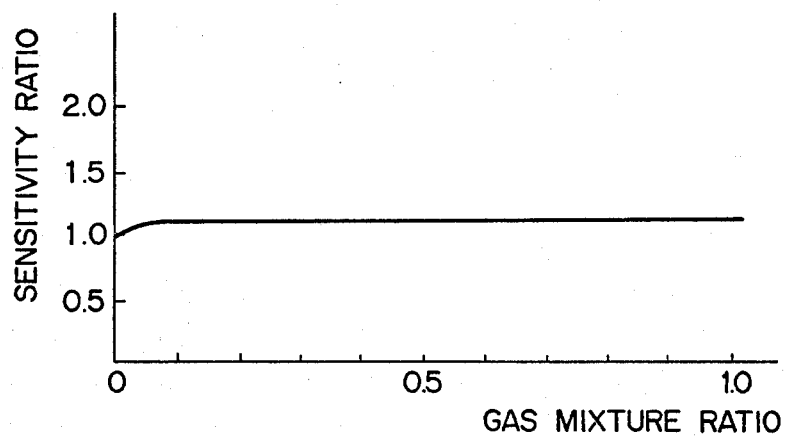

Referring to FIGS. 2A to 2C, $CH_4$ is selected as an organic gas containing C, the gas mixture ratio of Ar to $CH_4$ during sputtering is changed from 0 to 1, and light absorption factor, deposition rate ratio and sensitivity ratio characteristics are shown, respectively. The factor plotted along the ordinate of the characteristic graph in FIG. 2A corresponds to light energy which is absorbed per unit volume of the recording layer (thin film). Assume that the refractive index and the extinction coefficient are, respectively, defined as n and k. The light energy is proportional to 2nk. The deposition rate is plotted along the ordinate of the characteristic graph in FIG. 2B. The deposition rate is expressed by the rate ratio which is normalized with reference to the characteristic values in an atmosphere of 100% $CH_4$ gas, that is, $Ar/CH_4=0$. The sensitivity which is plotted along the ordinate of the characteristic graph of FIG. 2C is also expressed by a reciprocal number ratio (sensitivity ratio) of sensitivity normalized with reference to the characteristic values in the condition of $Ar/CH_4=0$.

As is apparent from these characteristic graphs, the light absorption of the recording layer 12 as described above increases in accordance with an increase of Ar gas content in the gas mixture. However, the deposition rate and the sensitivity are not greatly changed, resulting in only 10% changes. Especially, the sensitivity is maintained substantially constant when the ratio of Ar to $CH_4$ is more than about 0.1. The above constant value corresponds to the sensitivity obtained when a pure Te layer having a thickness of 400 Å is formed on the acrylic substrate 10. As a result, the recording medium according to the present invention is thus proved to have high sensitivity. Further, the recording layer of the thin film deposited by the sputtering is made amorphous. The surface of the recording layer which is melted by an energy beam such as the laser beam in the recording mode is made smooth as compared with Te having a polycrystalline structure. Therefore, the noise level is minimized in the reproducing mode. Further, the S/N ratio is greatly improved.

Figure 3:
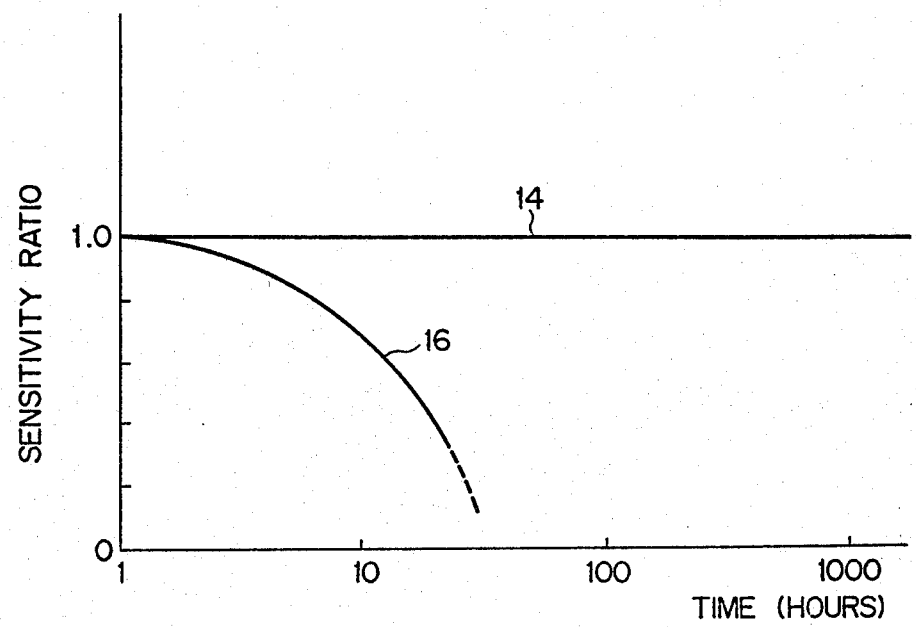
FIG. 3 is a graph illustrating the service life characteristics of the optical recording medium according to one embodiment of FIG. 1 when a predetermined test under forced conditions is performed.
Figure 4:
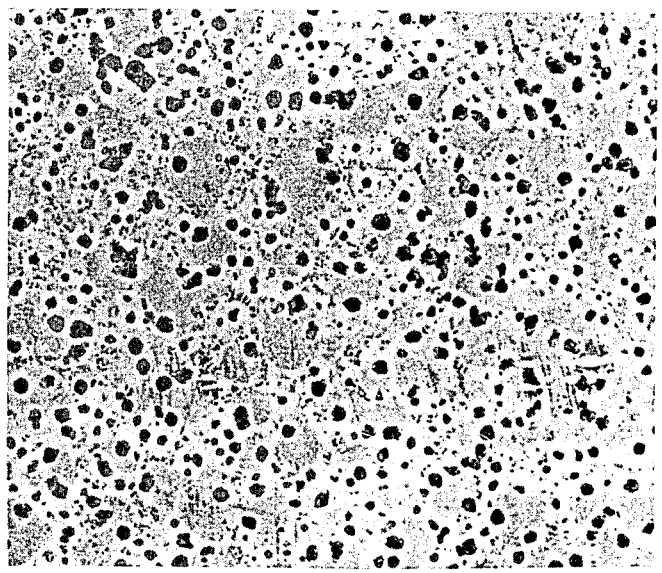
FIGS. 4 and 5 are microscopic photographs for comparing a conventional example with one embodiment of FIG. 1, showing how the texture of the recording layer is changed by the test of FIG. 3.

FIG. 3 shows the service life characteristics of the recording layer when the test for examining the degradation of sensitivity over time (unit: hour) is performed in a forced severe atmosphere of a temperature of 70° and a relative humidity of 85%. In particular, the initial value of the reciprocal number of energy required for recording is given as the reference. The degradation rate of sensitivity over time is shown with respect to the initial value. A line 14 indicates the degradation rate of sensitivity of the recording medium according to first embodiment of the present invention in the above test conditions. A line 16 indicates the degradation rate of the recording medium which has the pure Te layer as the recording layer on the acrylic substrate according to the prior art. As is apparent from this characteristic graph, the sensitivity of the recording layer comprising pure Te is abruptly lowered over time, as indicated by the line 16. The sensitivity of the conventional recording layer is lowered to about 40% of the initial value in 20 to 30 hours. The degradation of sensitivity of the conventional recording layer occurs when Te is oxidized over time to locally produce a region which comprises a transparent oxide. FIG. 4 shows a microscopic photograph (magnification: 50 times, taken by reflected light) illustrating the texture of the conventional recording layer comprising pure Te. Black dots correspond to the regions comprising the transparent oxide. These regions appear on the substantially entire surface of the recording layer in about 170 hours. As a result, the recording medium practically loses the function of recording.

Figure 5:
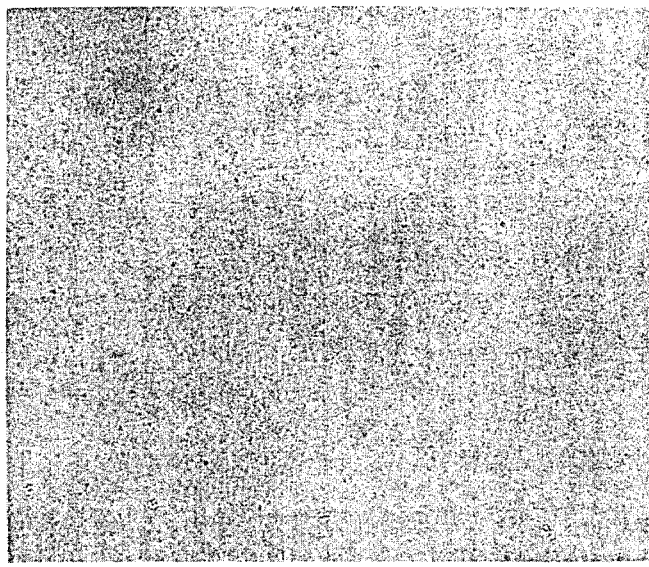

However, in the case of the recording layer according to the embodiment of the present invention, the degradation of sensitivity of the recording layer 12 did not occur substantially for at least 1000 hours after starting the test. In this condition, the texture of the recording layer 12 is shown in the microscopic photograph of FIG. 5 (magnification: 50 times, taken by reflected light). As is apparent from the photograph, the regions comprising the transparent oxide as shown in FIG. 4 are not shown in FIG. 5. Generally speaking, when time in the above test is figured as time under normal service conditions, the time in the test corresponds to about 150 times the time under normal service conditions. The recording medium according to the present invention theoretically can maintain high sensitivity for about 150,000 hours (or about 17 years). Therefore, the recording medium according to the present invention guarantees the maintenance of high sensitivity for 10 years as the reference for the long service life.

As described above, according to the first embodiment of the present invention, when the recording layer which contains C in the predetermined ratio is formed, the high sensitivity and long service life of the recording medium are accomplished. The content of C in the recording layer 12 is determined to be in the range of 5 to 50 atomic percent as described above. In a recording layer which contained C whose content was less than 5 atomic percent, significant improvement did not occur as compared with the conventional recording layer comprising pure Te. Further, in a recording layer which contained C whose content was more than 50 atomic percent, the degradation of sensitivity occured, thus resulting in undesirable effects.

Figure 6:
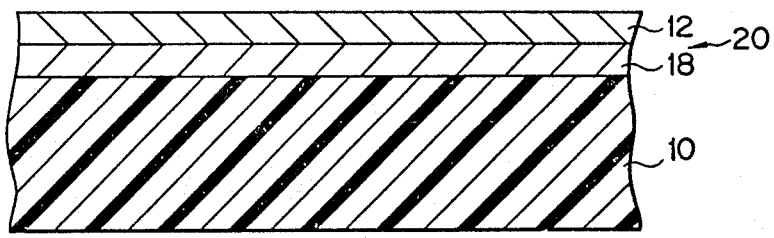
FIGS. 6 to 9C are sectional views illustrating the main part of an optical recording medium according to various other embodiments of the present invention.

FIG. 6 shows a recording medium according to a second embodiment of the present invention. A layer 18 of pure Te is formed on the acrylic substrate having a thickness of, for example, 1.5 mm. The layer 18 of pure Te is referred to as the Te layer 18 for brevity. A Te layer containing C (to be referred to as a Te-C layer hereinafter) 12 is formed on the Te layer 18. A recording layer portion 20 comprises the Te layer 18 and the Te-C layer 12. The Te-C layer 12 is generally formed to a thickness in the range of 100 Å to 1 μm. The Te-C layer 12 must be thick enough to protect the Te layer 18 from oxygen and moisture which are contained in the outer atmosphere and thin enough not to degrade the sensitivity. In order to satisfy the above contradictory conditions, in the second embodiment of the present invention, the Te-C layer 12 is formed to a thickness of about 300 Å. On the other hand, since the Te-C layer 12 is brown and semi-transparent, the Te layer 18 must be thick enough to accomplish the reflectance of more than a predetermined value and thin enough not to degrade the sensitivity. In consideration of the above conditions, the thickness of the Te layer 18 is determined to be in a range of 100 Å to 0.5 μm. In the embodiment of FIG. 6, the thickness was determined to be 400 Å.

The Te-C layer 12 was formed by sputtering in a gas mixture which had a $CH_4$ to Ar ratio of about 1:4. As a result, the Te-C layer 12 having a thickness of about 300 Å was formed. The sensitivity of the Te-C layer 12 is substantially the same as that of the Te layer 18 which is formed on the acrylic substrate 10 and which has a thickness of 400 Å.

According to the recording medium with the above structure of the second embodiment of the present invention, the recording layer portion 20 comprises the Te layer 18 and the Te-C layer 12. When the laser beam which changes its intensity in response to quantized information is radiated on the recording layer portion 20, the Te layer 18 and the Te-C layer 12 simultaneously melt and deform to form a hole or recess (pit) corresponding to the quantized information. In this case, the Te-C layer 12 not only acts as the recording layer but also functions as the protection layer. The Te-C layer 12 is less oxidized by the oxygen and moisture which are contained in the outer atmosphere than the layer 18 of pure Te. Therefore, the degradation of sensitivity of the recording medium over time is further reduced, accomplishing a long service life of the recording medium.

Figure 7:
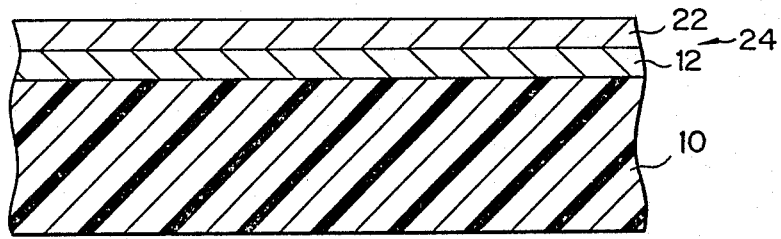

FIG. 7 shows a recording medium according to a third embodiment of the present invention. The Te-C layer 12 is directly formed on the acrylic substrate 10. Further, a metal layer 22 comprising Te, bismuth (B) or the like is formed on the Te-C layer 12. A recording layer portion 24 is constituted by the Te-C layer 12 and the metal layer 22. The thickness of the Te-C layer 12 may be determined to be in a range of several hundred Å to several thousand Å. The Te-C layer 12 is preferably formed to a thickness of less than 1000 Å. Other details of the structure in this embodiment are the same as in the previous embodiments of the present invention.

In the third embodiment, the recording layer is shielded from the outer atmosphere. Further, the laser beam is radiated from the substrate side. According to this embodiment, the Te-C layer 12 is interposed between the acrylic substrate 10 and the metal layer 22. When the substrate 10 is made of plastic such as an acrylic plastic, the Te-C layer 12 is firmly deposited on the substrate 10 and has stable physical characteristics. Therefore, the Te-C layer 12 shields the moisture or the like which permeates from the substrate side. Further, the Te-C layer 12 functions to prevent the recording layer from degradation. This degradation is caused by a chemical reaction between the recording layer and an unreacted monomer, an impurity and an additive which are contained in the plastic substrate 10. Since such a degradation is prevented by the Te-C layer 12, the Te-C layer 12 effectively functions as the protection layer against foreign materials such as an adhesive remaining on the substrate as well as the above mentioned unreacted monomer, impurity and additive, and, in addition, as the recording layer with high sensitivity. As a result, the characteristic degradation of the recording layer portion 24 over time is effectively prevented.

Figure 8:
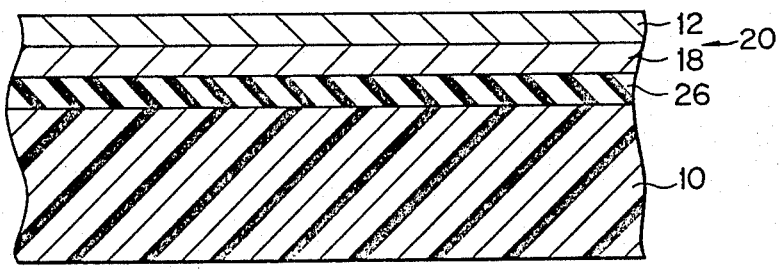

FIG. 8 shows a recording medium according to a fourth embodiment of the present invention. A low heat conduction material layer 26 is formed on the acrylic substrate 10. The thickness of the low heat conduction material layer 26 may be determined to be in a range of 100 Å to 10 μm. The low heat conduction material layer 26 is formed to shield the moisture or the like which is permeated through the acrylic substrate 10 over time. A physically and chemically stable material such as tellurium oxide (TeO) is selected as the low heat conduction material. The recording layer portion 20 which comprises the Te layer 18 and the Te-C layer 12 is formed on the low heat conduction material layer 26 (to be referred to as a Te-0 layer 26 for brevity hereinafter). The Te-0 layer 26 is interposed between the acrylic substrate 10 and the recording layer portion 20, so that the Te layer 18 is sandwiched by the Te-C layer 12 and the Te-0 layer 26.

According to the recording medium with the above structure, the Te-C layer 12 is shielded from the oxygen and moisture which permeates over time from the outer atmosphere. On the other hand, the Te-0 layer 26 functions as the protection layer which shields the oxygen and moisture which permeates from the substrate side. In this manner, the Te layer 18 is protected from the upper and lower sides by the Te-C layer 12 and the Te-0 layer 26, further guaranteeing the long service life of the recording medium. However, the Te-0 layer need not be formed. Instead, the Te-C layer 12 may be directly formed on the acrylic substrate 10 for this purpose, in the embodiment as shown in FIG. 7. The Te-C layer 12 functions as the recording layer and the protection layer, as apparent from the previous embodiments of the present invention.

Although the present invention has been shown and described with respect to particular embodiments, nevertheless, various changes and modifications which are obvious to a person skilled in the art to which the invention pertains are deemed to lie within the spirit, scope, and contemplation of the invention. For example, in the embodiment described above, the Te-C layer 12 is formed by sputtering in the atmosphere of the gas mixture of Ar and $CH_4$. However, the present invention is not limited to this. The Te-C layer 12 may be formed by sputtering in an atmosphere of Ar gas, using Te which contains C in a proper amount as the target to form the same thin film.

Figure 9A:
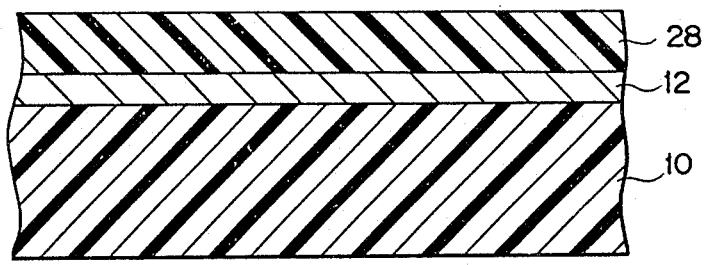
Figure 9B:
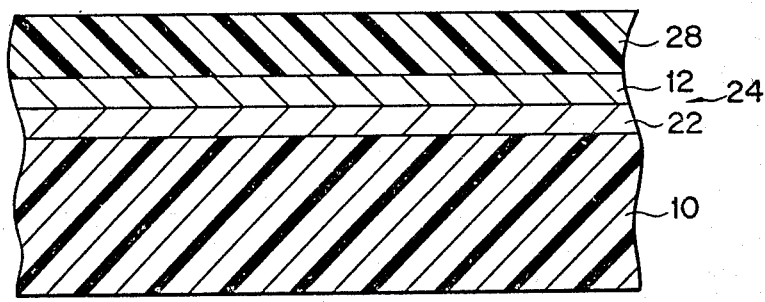
Figure 9C:
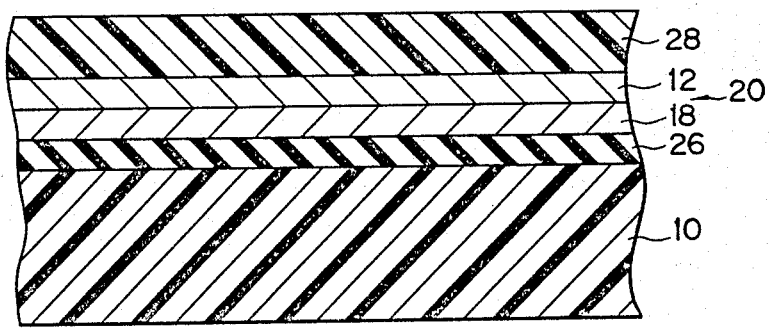

Further, in the above embodiments, a protection layer comprising an organic material may be formed, as shown in FIGS. 9A to 9C. Referring to FIGS. 9A to 9C, an organic protection layer is denoted by reference numeral 28. The organic protection layer 28 functions to protect the recording layer or the recording layer portion from damage and dust in the outer atmosphere. The organic protection layer 28 may be coated to a thickness of, for example, 1 μm to 10 mm. An ultra-violet-hardened resin may be used as the material for the organic protection layer 28. The laser beam is radiated on the recording layer 12 or the recording layer portion 20 or 24 through the organic protection layer 28 and information recording is thus performed.

What we claim is:

1. An optical recording medium comprising:
    recording layer means including a mixture layer containing tellurium as a base material and at least carbon at a predetermined ratio, for receiving an energy beam such as a laser beam whose intensity is changed in accordance with quantized information and for recording desired information by melt-deforming in response to the intensity of the energy beam, and
    substrate means for supporting said recording layer means.

2. An optical recording medium according to claim 1, wherein a content of carbon in said mixture layer of said recording layer means is about 5 to 50 atomic percent.

3. An optical recording medium according to claim 2, wherein a content of carbon in said mixture layer is preferably about 10 to 40 atomic percent.

4. An optical recording medium according to claim 1, wherein said recording layer means is formed on said substrate means.

5. An optical recording medium according to claim 4, wherein said substrate means is made of a transparent material selected from the group consisting of glass and a synthetic resin.

6. An optical recording medium according to claim 4, wherein said recording layer means comprises said mixture layer.

7. An optical recording medium according to claim 4, wherein said recording layer means further comprises a substantially pure tellurium layer, said tellurium layer being formed on said substrate means and said mixture layer being formed on said tellurium layer.

8. An optical recording medium according to claim 4, wherein said recording layer means further comprises a metal layer, said mixture layer being formed on said substrate means and said metal layer being formed on said mixture layer.

9. An optical recording medium according to claim 8, wherein said metal layer is made of one metal selected from the group consisting of tellurium and bismuth and, said metal layer has a thickness in a range of several hundred Å to several thousand Å.

10. An optical recording medium according to claim 9, wherein said metal layer preferably has a thickness of less than 1000 Å.

11. An optical recording medium according to claim 1, further comprising layer means interposed between said recording layer means and said substrate means, for chemically insulating said recording layer means from said substrate means.

12. An optical recording medium according to claim 11, wherein said layer means comprises a physically and chemically stable material.

13. An optical recording medium according to claim 11, wherein said substrate means is made of a synthetic resin.

14. An optical recording medium according to claim 11, wherein said recording layer means further comprises a substantially pure tellurium layer, said tellurium layer being sandwiched by said mixture layer and said layer means.

15. An optical recording medium according to claim 1, further comprising a protection layer made of an organic material, said protection layer being formed on said recording layer means.

16. An optical recording medium according to claim 15, wherein said organic protection layer has a thickness of 1 $\mu$m to 10 mm.

* * * * *